Patented Oct. 4, 1938

2,131,734

UNITED STATES PATENT OFFICE 2,131,734

HYDROGENATION OF MONO NITRATED ALKYL BENZENES

Clyde O. Henke, Wilmington, Del., and Roland G. Benner, Carneys Point, N. J., assignors to E. I. du Pont de Nemours & Company, Wilmington, Del., a corporation of Delaware No Drawing. Application December 8, 1936, Serial No. 114,860

31 Claims. (Cl. 260—130.5)

This invention relates to a process for the manufacture of mono amino alkyl benzenes, more particularly to a process for the manufacture of ortho toluidine, para toluidine, and the xylidines.

This case is a continuation-in-part of application Serial No. 45,827, filed October 19, 1935, which has become abandoned.

According to the literature, prior to 1913 most catalytic reduction of nitro compounds to amines with hydrogen in the presence of base metal catalysts were vapor phase reactions in which the vaporized nitro compound mixed with hydrogen was passed over a catalyst at an elevated temperature. Brochet in Bull, (4) 15, 554, 1914, stated that nitro compounds could be hydrogenated to amines in the liquid phase in the presence of a nickel catalyst with or without the use of solvents. He also stated that by the employment of caustic soda the reaction can be automatically stopped at intermediate reduction stages, thus obtaining azoxy, azo, and hydrazo bodies.

Later Brown, Etzel and Henke (J. Phys. Chem. 1928, 32, 631) obtained high yields of ortho and para toluidine by hydrogenating nitro toluene in the liquid phase with a nickel catalyst at 215° C. and using 40% to 50% catalyst based on the nitro compound.

This invention has as an object an improved process for the production of mono amino alkyl benzenes of the general formula

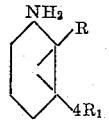

in which R means an alkyl group such as methyl, ethyl, propyl, or the long chain alkyl groups, and $R_1$ represents hydrogen or alkyl groups such as those enumerated. A further object is to produce these amines by liquid phase hydrogenation of the corresponding nitrated alkyl benzenes in the presence of a nickel catalyst supported on a siliceous material with a maximum yield and under practical operating conditions. A still further object is the production of o-toluidine, p-toluidine, and the xylidines.

These objects are accomplished by the following invention which comprises reducing mono nitrated alkyl benzenes to the corresponding amines with hydrogen in the presence of a nickel catalyst supported on a siliceous material and in the presence of a small amount of an alkaline substance such as caustic soda, and a small quantity of water. The amounts of alkaline materials to be used vary with the starting nitro body employed and the type of alkaline material. For obtaining the amines, much smaller amounts are invariably required than have previously been employed for the production of intermediate products described in the literature. The actual amount of caustic soda varies from traces up to 0.3% of the nitro starting material. When the reaction is complete the catalyst is then removed from the reduced mass by filtration and the water layer separated by decantation; the amine thus produced may be further refined by distillation. Thus the applicants have discovered, that by the addition of an alkaline substance in regulated amounts, amines substantially free from azoxy, azo, or hydrazo bodies may be formed employing practical working conditions.

To illustrate the applicability of this invention it is only necessary to consider modification of the above process, varying same with respect to the water and caustic soda. For example, if a dry mono nitrated alkyl benzene and a practical amount of a catalyst comprising active nickel supported on a siliceous material (0.5% to 2% of the weight of the nitro body) are charged into an autoclave and heated to 80° to 140° C. under a hydrogen pressure of 200 to 500 pounds per square inch, the nitro compound does not appreciably start to reduce until after the conditions have been maintained for approximately ½ to 1 hour. When there is an appreciable starting of the reaction the reduction then becomes rapid and continues until about ⅓ to ⅔ of the mono nitrated alkyl benzene has been converted. At this point the reaction becomes so slow that the remaining unreacted nitrobody can not be converted to the amine in a reasonable length of time. This example illustrates the process when carried out in the absence of water and an alkaline substance. If the process, however, is varied by the addition of water equal to about 5% of the weight of the nitrobody and the charge heated under the same conditions of temperature and pressure, the hydrogenation starts immediately but again becomes exceedingly slow when the reaction of the nitrobody to the amine is about ⅓ to ⅔ complete. By again repeating the experiment but this time adding together with the 5% of water a suitable amount of an alkaline substance such as from a trace up to 0.3% of caustic soda based on the nitro alkyl benzene and this charge including the same amounts of nitrobody and catalyst as used above are subjected to the same conditions of temperature and pressure, the reaction proceeds rapidly and completely to the amine and no significant amounts of azoxy, azo, or hydrazo bodies are present in the reduced mass. This same result cannot be accomplished, however, by the addition of the alkaline substance to the reaction mass after the hydrogenation to the formation of amines has stopped at the ⅓ to ⅔ point indicated in the above examples. This action of the alkaline body is, therefore, not explainable but its presence appears to be necessary to obtain a substantially complete inversion of the nitro body to the amine when using a practical amount of catalyst.

The most practical amount of catalyst that can be used is the smallest amount required to reduce the nitrated alkyl benzene completely to the amine in a reasonably short length of time under the specific mode of operation. If more catalyst (4 to 10 times the amount actually required) is used, an alkaline substance is not always required. However, catalyst is an important item in the cost of manufacture of these amines by hydrogenation, and the employment of large quantities of catalyst negative the actual economies possible when compared with other methods. By the use of large amounts of catalyst, nitrated alkyl benzenes can be reduced when mixed with large quantities of water containing no alkaline reagent, but the production of amine per charge is decreased by an amount equal to the excess volume of water employed.

The amount of alkali used in the reduction depends on the particular mono nitro alkyl benzene to be reduced, but should be used within rather narrow limits for each particular nitro compound for optimum results. An excessive amount of alkali promotes the formation of intermediate reduction compounds and other impurities, thus lowering the yield and quality of the final product. Various alkaline substances may be used. They may be free bases or salts of weak acids and strong bases, which react alkaline. The free bases that were successfully used were caustic soda, caustic potash, barium hydroxide, and tetra ethyl ammonium hydroxide. The salts that were successfully used were trisodium phosphate, sodium acetate, and borax. Many other alkaline substances can also undoubtedly be used, since it appears to be a question of alkalinity rather than the type of alkaline reagent employed.

The following examples illustrate the invention:

Example I

To 100 parts o-nitrotoluene and .75 part nickel-on-kieselguhr catalyst (containing 25% reduced or active nickel), in an autoclave equipped for rapid agitation, are added 5 parts water containing .09 part caustic soda. The autoclave is closed, and the nitrotoluene is reduced at 80° to 100° C. under 400 to 500 pounds hydrogen pressure. When hydrogen absorption has ceased the pressure on the autoclave is released, and the mass is filtered. The filtrate contains o-toluidine and water, the latter being separated from the amine by decantation. The amine as thus produced is vacuum distilled through a short column, colorless o-toluidine distillate being obtained in the amount equivalent to a yield of 97% to 99% of the theoretical yield. The caustic soda used in this example may be replaced with .12 part barium hydroxide, or .09 part caustic potash, or .18 part tetra ethyl ammonium hydroxide, and comparable yields and quality of product secured.

Example II

To 100 parts p-nitrotoluene and 0.5 part nickel-on-kieselguhr catalyst (containing 25% reduced nickel) are added 5 parts water containing .03 part caustic soda. The mass is hydrogenated at 90° to 110° C. under 400 to 500 pounds hydrogen pressure and then treated as in Example I. Colorless p-toluidine which analyzes 99% to 100% is obtained in 98% to 99% of the theoretical yield. The caustic soda may be replaced with .03 part caustic potash, 0.3 part hydrated sodium acetate, or 0.3 part borax, etc.

Example III

To 100 parts mixed nitroxylene obtained by nitrating mixed xylene are added 1.5 parts nickel-on-kieselguhr catalyst (containing 25% reduced nickel) and 5 parts water containing .09 part caustic soda. The mixture is hydrogenated at 110° to 140° C. under pressure of 200 to 500 pounds and then treated as in Example I. Mixed xylidines, which are colorless and analyze 99% to 100%, are obtained in 96% to 98% of the theoretical yield.

This invention applies to the use of all inorganic and organic alkaline substances which promote a more rapid or complete hydrogenation than is obtained without their use when they are added in suitable quantities to a hydrogenation mass consisting of mono nitrated alkyl benzene, a practical amount of nickel catalyst, and a small quantity of water. The water is present preferably in an amount of about 5% by weight of the nitro body but this may vary in amount from about 1% to an equal weight of the nitro compound.

The amounts of the materials used in the above illustrations may vary and the invention is not limited to the quantities of alkaline materials, water, or catalyst given in these examples. Any catalyst comprising active or reduced nickel supported on a siliceous material may be adapted to this invention. Catalysts that are particularly suitable are those where the nickel is supported on kieselguhr and especially where the total catalyst contains 20% to 30% reduced or active nickel.

Besides the compounds disclosed in the examples other mono nitrated alkyl benzenes of the general formula

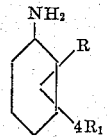

in which R means an alkyl group such as methyl, ethyl, propyl, or the long chain alkyl groups such as dodecyl, etc., and the $R_1$ represents hydrogen or one of the alkyl groups enumerated.

The most practical conditions found for making these amines are given in the above examples, but temperatures of 60° to 150° C. and any pressures above 200 pounds per square inch may also be used. Better amines and slightly higher yields are usually obtained at low temperatures and high pressures.

By the use of suitably quantities of an alkaline substance and a small amount of water in the hydrogen reduction of mono nitrated alkyl benzenes, amines of exceptional purity are economically obtained in 96% to 99% of theoretical yields. No appreciable amounts of azo, azoxy, or hydrazo bodies are present in the amine after the reaction is complete and colorless amines can be obtained by distillation. These amines can be produced by hydrogenation of mono nitrated alkyl benzenes with a practical amount of catalyst and in a very small quantity of water.

As many apparently widely different embodiments of this invention may be made without departing from the spirit and scope thereof, it is to be understood that we do not limit ourselves to the specific embodiments thereof except as defined in the appended patent claims.

We claim:

1. A process for the manufacture of mono amino alkyl benzenes, which comprises catalytically hydrogenating mono nitrated alkyl benzenes in the liquid phase, said hydrogenation being carried out in the presence of a nickel catalyst supported on a siliceous material, an alkaline compound in an amount sufficient to produce the alkalinity obtained when caustic soda is used in amounts of from about 0.006% to about 0.30% by weight of the nitro body, and water in an amount less than that equal to the weight of the nitro body.

2. The process in accordance with claim 1 characterized in that the alkaline compound is caustic soda.

3. The process in accordance with claim 1 characterized in that the alkaline compound is caustic soda and in the amount from about 0.006% to about 0.30% of the weight of the nitro compound.

4. The process in accordance with claim 1 characterized in that the water is in the amount from about 1% to an equal weight of the nitro compound.

5. The process in accordance with claim 1 characterized in that the catalyst is a nickel-on-kieselguhr catalyst.

6. The process in accordance with claim 1 characterized in that the catalyst contains from 20% to 30% reduced nickel.

7. The process in accordance with claim 1 characterized in that the catalyst comprises essentially from 20% to 30% reduced nickel supported on kieselguhr.

8. A process for the manufacture of mono amino alkyl benzenes, which comprises catalytically hydrogenating mono nitrated alkyl benzenes in the liquid phase, said hydrogenation being carried out in the presence of a nickel catalyst supported on a siliceous material, caustic soda in an amount from about 0.006% to about 0.30% by weight of the nitro compound and water in amount from about 1% to an equal weight of the nitro compound.

9. A process for the manufacture of a mono amino benzene substituted by at least one methyl group, which comprises catalytically hydrogenating the corresponding nitrated methyl substituted benzene in the liquid phase, said hydrogenation being carried out in the presence of a nickel catalyst supported on a siliceous material, an alkaline compound in an amount sufficient to produce the alkalinity obtained when caustic soda is used in amounts of from about 0.006% to about 0.30% by weight of the nitro body, and also in the presence of water in an amount less than that equal to the weight of the nitro body.

10. The process in accordance with claim 9 characterized in that the alkaline compound is caustic soda.

11. The process in accordance with clam 9 characterized in that the alkaline compound is caustic soda and in the amount from about 0.006% to 0.30% of the weight of the nitro compound.

12. The process in accordance with claim 9 characterized in that the water is in the amount from about 1% to about 100% of the weight of the nitro compound.

13. A process for the production of a mono amino benzene substituted by at least one methyl group, which comprises reacting in the liquid phase the corresponding mono nitro methyl substituted benzene with hydrogen at a temperature between 60° and 150° C. and at a pressure above 200 pounds per square inch in the presence of a nickel catalyst supported on a siliceous material, said reaction being carried out in the presence of an aqueous alkaline solution, said alkaline compound being in an amount sufficient to produce the alkalinity obtained when caustic soda is used in amounts of from about 0.006% to about 0.30% by weight of the nitro body.

14. The process in accordance with claim 13 characterized in that the reaction is carried out at a pressure between 400 and 500 pounds per square inch.

15. The process in accordance with claim 13 characterized in that the catalyst is in an amount equivalent to from about 0.5% to about 1.5% by weight of the nitro compound being treated.

16. The process in accordance with claim 13 characterized in that the alkaline compound is caustic soda.

17. A process for the manufacture of ortho toluidine, which comprises catalytically hydrogenating ortho nitrotoluene in the liquid phase, said hydrogenation being carried out in the presence of a nickel catalyst supported on a siliceous material, an alkaline compound in an amount sufficient to produce the alkalinity obtained when caustic soda is used in amounts of from about 0.006% to about 0.30% by weight of the nitro body, and also in the presence of water in an amount less than that equal to the weight of the nitro body.

18. A process for the production of ortho toluidine, which comprises reacting ortho nitro toluene in the liquid phase with hydrogen at a temperature from about 80° to about 100° C. and a pressure from about 400 to about 500 pounds per square inch, in the presence of a nickel catalyst supported on a siliceous material and caustic soda in the amount from about 0.30% to about 0.16% of the weight of the nitro compound and also in the presence of water in the amount from about 5% to about 6% by weight of the nitro compound.

19. The process in accordance with claim 18 characterized in that the caustic soda is in the amount of about 0.1% by weight of the nitro comound.

20. The process in accordance with claim 18 characterized in that the catalyst comprises essentially from 20% to 30% reduced nickel supported on kieselguhr and is in an amount of about 0.75% by weight of the nitro compound.

21. The process in accordance with claim 18 characterized in that the caustic soda is in the amount from about 0.10% by weight of the nitro compound and the catalyst comprises essentially from 20% to 30% reduced nickel supported on kieselguhr and is in the amount of about 0.75% by weight of the nitro compound.

22. A process for the manufacture of para toluidine, which comprises catalytically hydrogenating para nitro toluene in the liquid phase, said hydrogenation being carried out in the presence of a nickel catalyst supported on a siliceous material, an alkaline compound in an amount sufficient to produce the alkalinity obtained when caustic soda is used in amounts of from about 0.006% to about 0.30% by weight of the nitro body, and also in the presence of water in an amount less than that equal to the weight of the nitro body.

23. The process for the preparation of para toluidine, which comprises reacting para nitro toluene in the liquid phase with hydrogen at a temperature from about 90° C. to about 110° C. and at a pressure from about 400 to about 500 pounds per square inch in the presence of a nickel-on-kieselguhr catalyst and caustic soda in the amount from about 0.006% to about 0.10% by weight of the nitro compound and also in the presence of water in the amount from about 5% to about 6% by weight of the nitro compound.

24. The process in accordance with claim 23 characterized in that the caustic soda is in the amount of about 0.32% by weight of the nitro compound.

25. The process in accordance with claim 23 characterized in that the catalyst comprises essentially from 20% to 30% reduced nickel supported on kieselguhr and is in the amount of 0.50% by weight of the nitro compound.

26. The process in accordance with claim 23 characterized in that the caustic soda is in the amount of about 0.032% by weight of the nitro compound and the catalyst comprises essentially from 20% to 30% reduced nickel supported on kieselguhr and is in the amount of 0.50% by weight of the nitro compound.

27. A process for the manufacture of mixed xylidines, which comprises catalytically hydrogenating mixed nitro xylenes in the liquid phase, said hydrogenation being carried out in the presence of a nickel catalyst supported on a siliceous material, an alkaline compound in an amount sufficient to produce the alkalinity obtained when caustic soda is used in amounts of from about 0.006% to about 0.30% by weight of the nitro body, and also in the presence of water in an amount less than that equal to the weight of the nitro body.

28. A process for the production of a xylidine, which comprises reacting a nitro xylene with hydrogen at a temperature from about 110° to about 140° C. and a pressure from about 400 to about 500 pounds per square inch in the presence of a nickel-on-kieselguhr catalyst and caustic soda in the amount from about 0.30% to about 0.16% by weight of the nitro compound and also in the presence of water from about 5% to about 6% by weight of the nitro compound.

29. The process in accordance with claim 28 characterized in that the caustic soda is in the amount of about 0.10% by weight of the nitro compound.

30. The process in accordance with claim 28 characterized in that the catalyst comprises essentially from 20% to 30% reduced nickel supported on kieselguhr and is in the amount of about 1.5% by weight of the nitro compound.

31. The process in accordance with claim 28 characterized in that the caustic soda is in the amount of about 0.10% by weight of the nitro compound and the catalyst comprises essentially from 20% to 30% reduced nickel supported on kieselguhr and is in the amount of about 1.5% by weight of the nitro compound.

CLYDE O. HENKE.
ROLAND G. BENNER.